(12) United States Patent
Kim

(10) Patent No.: US 6,512,826 B1
(45) Date of Patent: Jan. 28, 2003

(54) MULTI-DIRECTIONAL HAND-FREE KIT

(75) Inventor: Gwang Ho Kim, Incheon (KR)

(73) Assignee: Westech Korea Inc., Incheon (KR)

( * ) Notice: Subject to any disclaimer, the term of this patent is extended or adjusted under 35 U.S.C. 154(b) by 0 days.

(21) Appl. No.: 09/226,187

(22) Filed: Jan. 7, 1999

(30) Foreign Application Priority Data

Nov. 30, 1998 (KR) .......................... 98-23672

(51) Int. Cl.⁷ .............................................. H04M 1/00
(52) U.S. Cl. ......................... 379/420.04; 379/420.01; 379/420.02; 381/334; D14/253; 455/569
(58) Field of Search ................ 381/87, 334, 77; 379/420.01, 420.02, 420.03, 420.04, 428.01, 428.04, 429, 433.01, 433.02, 433.05, 433.11, 433.12, 433.13, 441, 454, 457, 195, FOR 447; 455/568, 569, 575, 90

(56) References Cited

U.S. PATENT DOCUMENTS

| | | | |
|---|---|---|---|
| 5,313,514 A | | 5/1994 | Kanasashi .............. 379/420.04 |
| 5,335,285 A | | 8/1994 | Gluz ........................... 381/381 |
| 5,490,213 A | | 2/1996 | Huang ........................ 329/442 |
| D384,937 S | * | 10/1997 | Liu ............................. D13/108 |
| 5,749,057 A | * | 5/1998 | Takagi ......................... 455/569 |
| 5,787,167 A | * | 7/1998 | Anderson .................... 379/446 |
| 5,802,167 A | * | 9/1998 | Hong .......................... 379/388 |
| 5,839,919 A | * | 11/1998 | Chen ........................... 439/529 |
| D404,037 S | * | 1/1999 | Gomez et al. .............. D14/240 |
| 5,991,646 A | * | 11/1999 | Frank et al. ................. 455/569 |
| 6,058,184 A | * | 5/2000 | Frank ...................... 379/420.02 |
| D430,148 S | * | 8/2000 | DeLeon ..................... D14/240 |
| D461,461 S | * | 8/2000 | Adamson et al. .......... D14/147 |
| 6,138,041 A | * | 10/2000 | Yahia .......................... 455/569 |
| 6,397,046 B1 | * | 5/2002 | Kfoury .......................... 455/90 |

FOREIGN PATENT DOCUMENTS

EP   0585011   *  3/1994   ................. 455/569

* cited by examiner

*Primary Examiner*—Xu Mei
(74) *Attorney, Agent, or Firm*—Nixon Peabody LLP; Thomas W. Cole (57) ABSTRACT

A multi-directional hand-free kit. The kit has a main body receiving a printed circuit board therein for controlling audio signal sending and receiving incorporated with a mobile communication device and formed with a first oblique portion, a connector member connected to an external power source and formed at a portion thereof facing the first oblique portion with a second oblique portion which frictionally makes contact with the first oblique portion, and a shaft member for connecting the main body and the connector member in such a manner that the main body and the connector member are obliquely rotatable to each other.

14 Claims, 8 Drawing Sheets

MULTI-DIRECTIONAL HAND-FREE KIT

BACKGROUND OF THE INVENTION

1. Field of the Invention

The present invention relates to a hand-free kit for a mobile wireless communication device, and more particularly to a hand-free kit having a speaker, a microphone and an earphone which can be freely directed toward a listener or a speaker and is designed to be installed to any types of vehicles.

2. Description of the Prior Art

One necessary for using a mobile telephone inside a car is known as a hand-free accessory. When the hand-free accessory is provided in a car and a mobile telephone is connected to this hand-free accessory, it is possible to switch between a microphone and a speaker built into the mobile telephone or mounted inside the car, so that it is possible to have hand-free telephone conversations.

Figure 1:
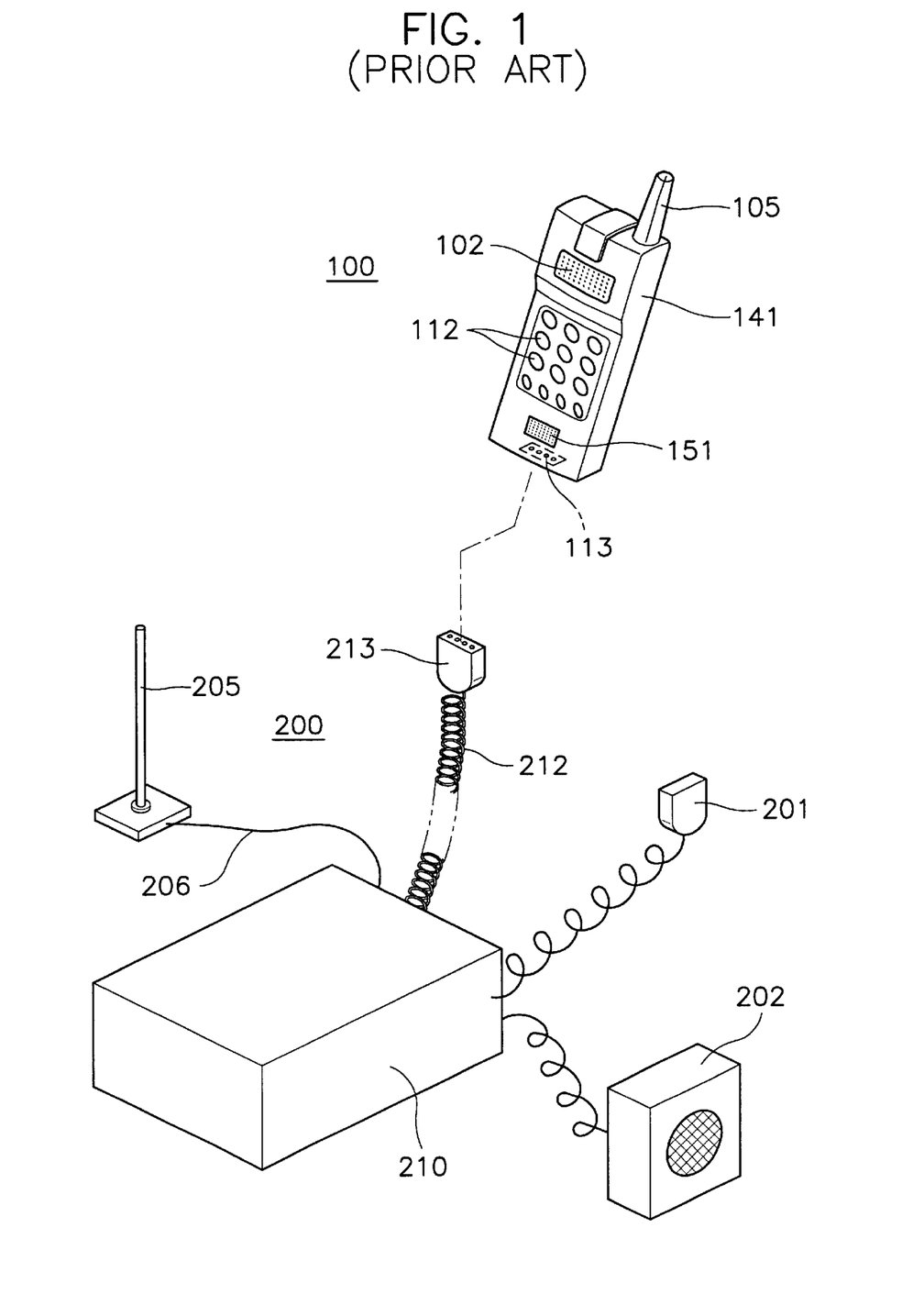
FIG. 1 is a perspective view of a conventional hand-free kit.

FIG. 1 shows an exterior of an ordinary mobile telephone 100 and a conventional hand-free kit 200. Referring to FIG. 1, a flat rectangular boxlike plastic case 141 constitutes a main body of mobile telephone 100. An antenna 105 for transmission and reception is mounted on a top of case 141. A speaker 102, a microphone 151, and operating keys 112 such as dialing keys are provided on a front of case 141.

A main unit 210 of hand-free kit 200 is disposed, for example, in a vehicle between a driver's seat and a passenger's seat or under a dashboard. A connector plug 213 for being connected to a connector jack 113 of mobile telephone 100 is connected to main unit 210 by a curl cord 212.

A microphone 201 and a speaker 202 for hand-free use are connected to main unit 210 by cords and may be mounted somewhere in the vehicle. Also, an external antenna 205 is connected to main unit 210 by a coaxial cable 206.

Meanwhile, a sound, particularly a high frequency sound has a narrow dispersion bandwidth and is thus very directional. In order to optimize sound imaging, the high frequency sound must be directed at the listener. Therefore, a speaker placement is critical to the quality of an automobile sound system. Unfortunately, conventional audio speakers mounted in vehicle passenger compartments can not custom-aim to the listener.

Also, every vehicle has a different model in terms of layout and dimension, and thus, no stationary speaker is perfectly suited for every vehicle. Moreover, the conventional positioning of speakers within the passenger compartment further inhibits the ability to custom-aim sound at the listener. In addition, cigar portions equipped in various vehicles for supplying a power to the hand-free kit are different in shape and structure thereof, which results in that the conventional fixed type hand-free kit may interfere with the cigar portions in some models of vehicles, so in some cases, the kit can not be connected to some of the cigar portions.

Meanwhile, U.S. Pat. No. 5,335,285 discloses an earphone type speaker assembly. The speaker assembly is slideably mounted around a glass frame, thereby transmitting a sound directly toward the ears of a listener. However, there is needed a separate mounting frame, that is the frame of an eye glasses, and even if a driver wears the eye glass, the speaker assembly is not available in every model of the eye glasses. On the other hand, U.S. Pat. Nos. 5,313,514 and 5,490,213 disclose hand-free kits. However, they also do not teach a rotatable speaker system, so they can not overcome the above described problems.

SUMMARY OF THE INVENTION

The present invention is intended to provide a hand-free kit, whose structure is simple, having a rotatable main body equipped with a speaker section, a microphone socket, earphone socket and an LED.

In order to achieve the above object of the present invention, there is provided a hand-free kit for a wireless communication device, the kit comprises: a main body receiving a printed circuit board therein for controlling audio signal sending and receiving incorporated with the communication device, and formed at one side thereof with a first oblique portion; a connector member connected to an external power source so as to electrically communicate with the printed circuit board, the connector member being formed at a portion thereof facing the first oblique portion with a second oblique portion inclined by a substantially identical angle to the first oblique portion, the second oblique portion frictionally making contact with the first oblique portion; and a shaft member for connecting the main body and the connector member in such a manner that the main body and the connector member are obliquely rotatable to each other.

The main body includes first and second housing which are detachable from each other and a speaker portion for forwardly propagating a sound wave, the speaker portion being electrically communicated with the printed circuit board.

The main body includes at outer sides thereof with a microphone socket, a earphone socket, a light emitting diode for indicating operational modes of the printed circuit board and a volume knob for controlling a volume of the audio signal propagating outwardly from the speaker portion, each of which is electrically communicated with the printed circuit board.

The speaker portion, the microphone socket, the earphone socket and the light emitting diode turn with respect to the shaft member when the main body rotates.

The connector member includes third and fourth housing extending in one direction and detachable from each other, and includes at a first portion thereof connected to the external power source with a pin which is made of a conductive material and extends outwardly toward the external power source, the connector member receiving a fuse therein for preventing over-current.

According to a preferred embodiment of the present invention, a compression spring is disposed between the pin and the fuse so as to urge the pin toward the external power source.

The first portion of the connector member is inserted into a holder having a ring shape, and a cap is engaged with the first portion, thereby assembling the third and fourth housing together in corporation with the holder.

The connector member is provided at both sides with a couple of plate springs bent outwardly by a predetermined thickness so as to be stably inserted into the external power source.

The shaft member has a substantially cylindrical shape, is formed at a first end portion thereof with first and second flanges and is formed at a second end portion thereof with an annular groove, the first and second flanges being slidably engaged with the second oblique portion of the connector member, the annular groove being inserted through the first oblique portion of the main body by a predetermined depth.

According to a preferred embodiment of the present invention, an axial direction of the shaft member is orthogonal to the first and second oblique portions.

The first and second flanges are spaced apart from each other by a substantially identical interval to a thickness of the second oblique portion so as to be inserted into an opening formed at the second oblique portion, thereby rotatably supporting the second oblique portion.

According to a preferred embodiment of the present invention, an E-ring is disposed around the annular groove of the shaft member and makes contact with an inner wall around an opening formed at the first oblique portion so as to prevent the main body from being separated therefrom.

The printed circuit board in the main body and the first portion of the connector member are electrically communicated with each other by electric lines extending through a core of the shaft member.

According to a preferred embodiment of the present invention, an O-ring is disposed around the shaft member between the main body and the connector member, thereby rendering the main body smoothly to slide with respect to the connector body.

The multi-directional hand-free kit in accordance with a preferred embodiment of the present invention can be adjustable in the sound propagation direction thereof to pace with the listener. That is, the positions of the speaker portion, the microphone, the earphone and the light emitting diode are easily controlled, thereby satisfying the listener with an optimal environment.

In addition, the main body and the connector member are respectively separable so that the assembling and disassembling thereof are ready, thereby facilitating a repair work therefor.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE INVENTION

Hereinafter, a preferred embodiment of the present invention will be explained in more detail with reference to the accompanying figures.

Figure 2:
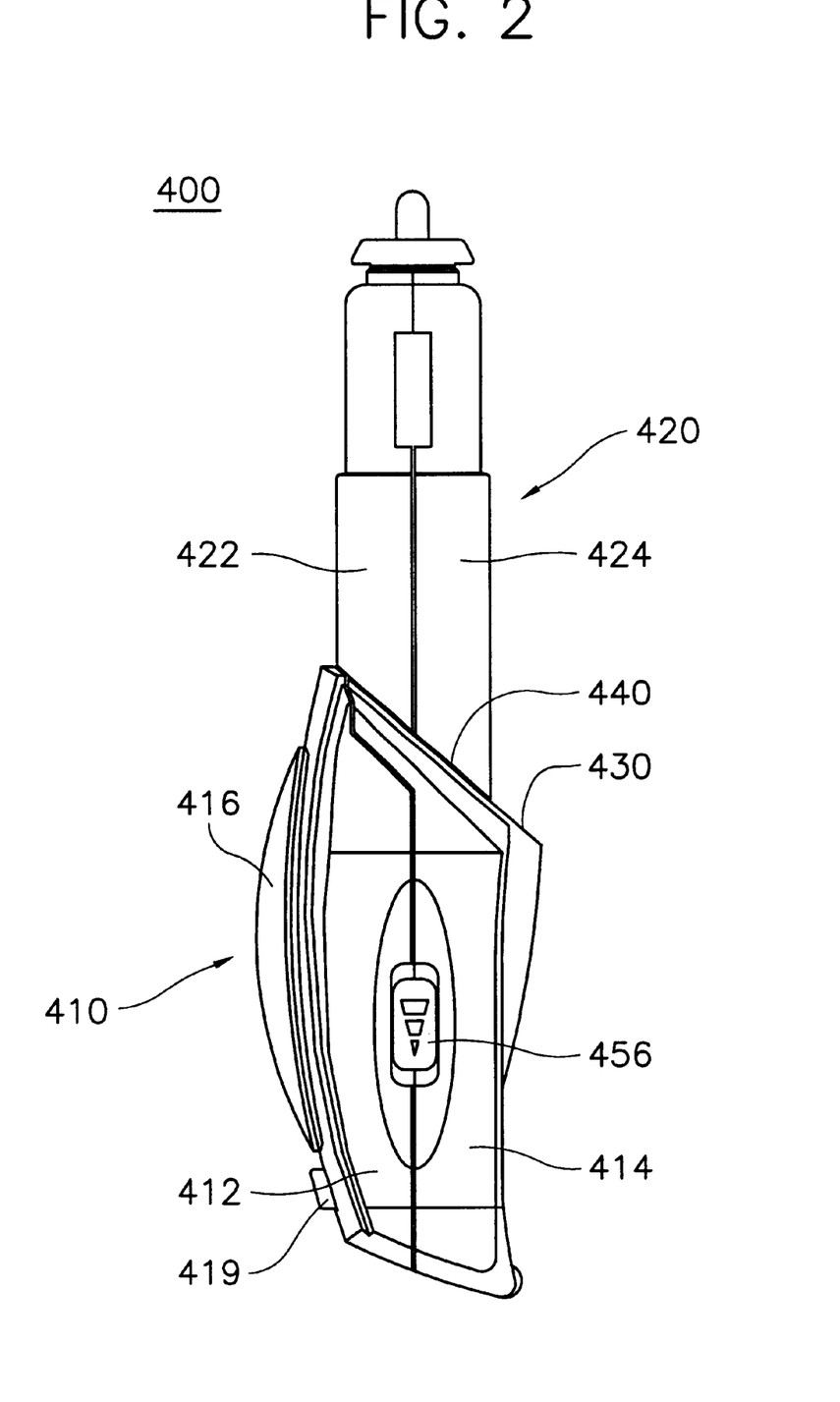
FIG. 2 is a side view of a multi-directional hand-free kit in accordance with a preferred embodiment of the present invention.
Figure 3:
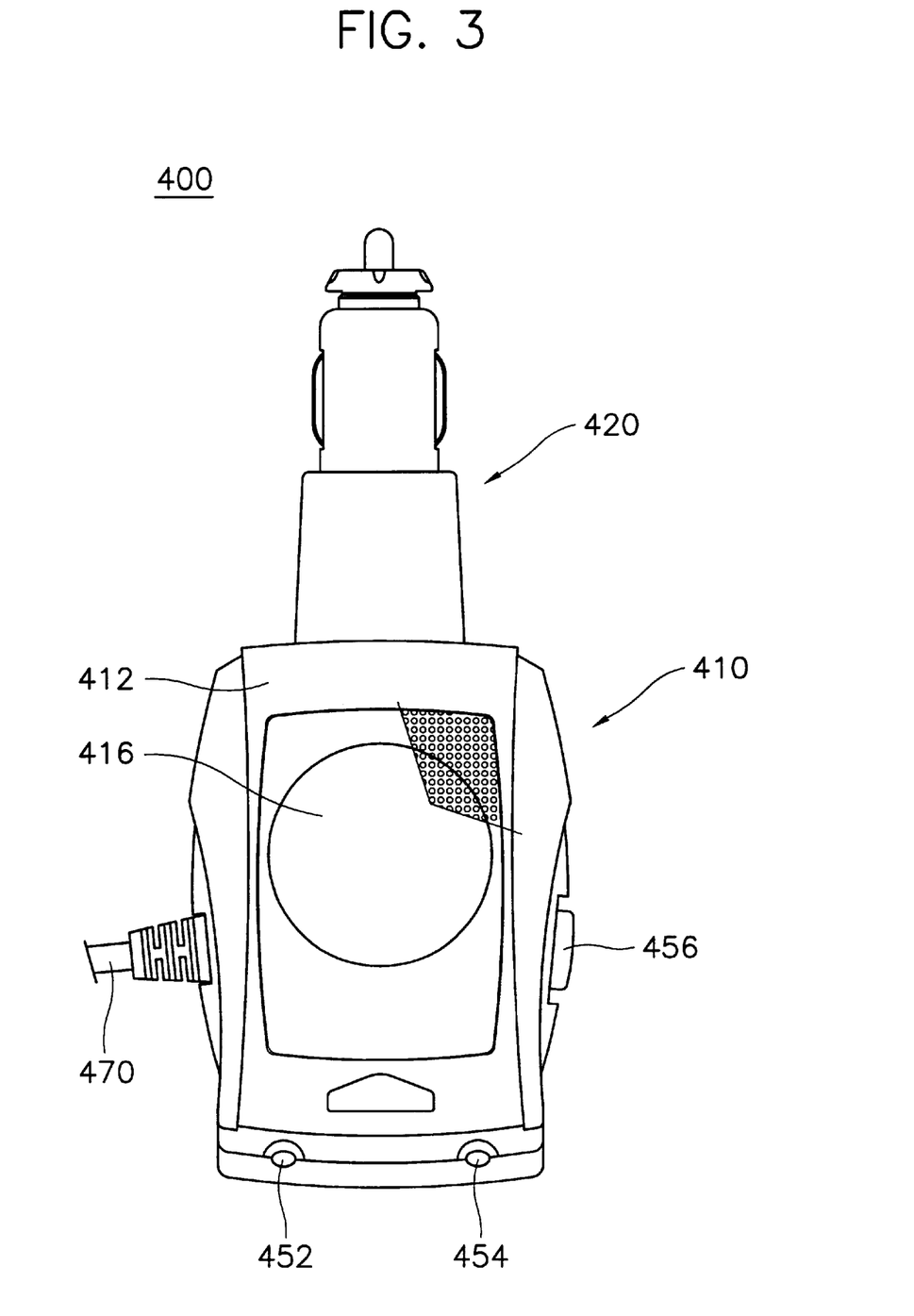
FIG. 3 is a front view of the hand-free kit shown in FIG. 2.
Figure 4:
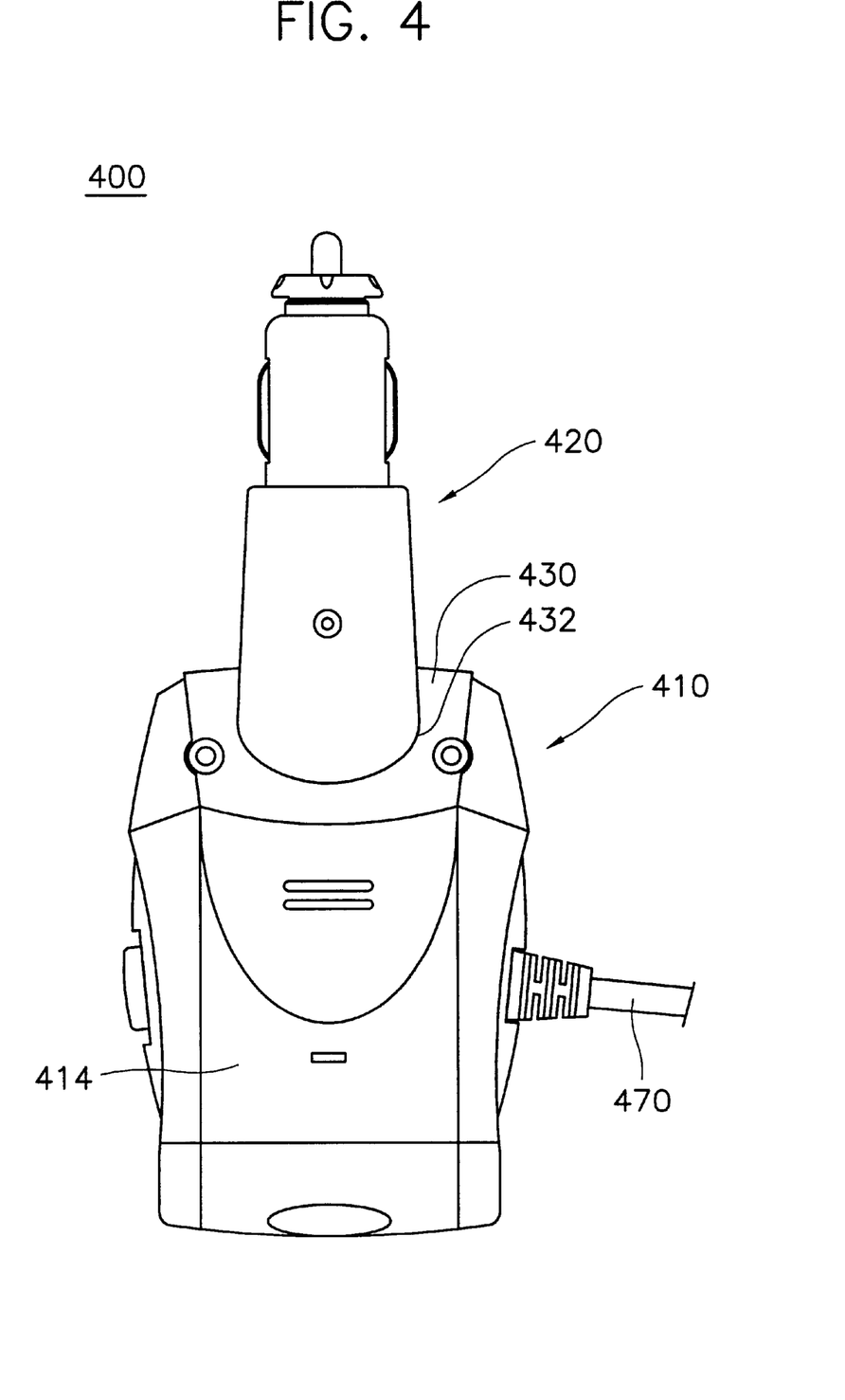
FIG. 4 is a rear view of the hand-free kit shown in FIG. 2.

FIGS. 2 to 4 respectively show a side view, a front view and a rear view of a multi-directional hand-free kit 400 in accordance with a preferred embodiment of the present invention. One necessary for using a mobile telephone inside a car is known as a hand-free kit. When the hand-free kit is provided in a car and a mobile telephone is connected to this hand-free kit, it is possible to switch between a microphone and a speaker built into the mobile telephone or mounted inside the car, so that it is possible to have hand-free telephone conversations.

Referring to FIGS. 2 to 4, hand-free kit 400 includes a main body 410, a connector member 420 and a shaft member 500 for connecting main body 410 and connector member 420 in such a manner that main body 410 and connector member 420 are obliquely rotatable to each other. Main body 410 is a substantially cubic body and includes first and second housings 412 and 414 which are detachable from each other. According to the generic claim of the, present application, the fact that the shape of main body 410 can be cubic, spherical or the like is evident to a person skilled in the art.

First housing 412, referring particularly to FIG. 3, is formed with a grill portion 416 so as to propagate a sound therethrough. An inside of grill portion 416, a speaker portion 417 receiving a diaphragm (not shown) therein for generating the sound is installed. Second housing 414 is formed at an upper side thereof with a first oblique portion 430 formed with a first opening 432 having a predetermined size. A plug cord 470 extends outwardly from a side portion of main body 410 so as to be connected to a hand-free connecting socket (not shown) of a mobile wireless communication device (not shown).

Connector member 420 includes third and fourth housings 422 and 424 which are detachable from each other. Connector member 420 is a substantially elongated cylindrical member extending in one direction so as to be connected to a cigar portion (not shown) of a vehicle. The cigar portion is a heating portion positioned between a driver's set and a passenger's seat, and is typically installed in most of the vehicles. Third and fourth housings 422 and 424 are formed at a lower end portion facing to first oblique portion 430 with a second oblique portion 440 formed with a second opening 442 having a substantially identical size to first opening 432.

The reason that main body 410 and connector member 420 are formed with first and second oblique portions 430 and 440 which are slidably ratable to each other is to render main body 410 to obliquely turn with respect to connector member 420. That is, if there are only flat contacting portions therebetween, the main body can rotate only, but never be adjusted in a direction toward which the sound propagate.

Figure 5:
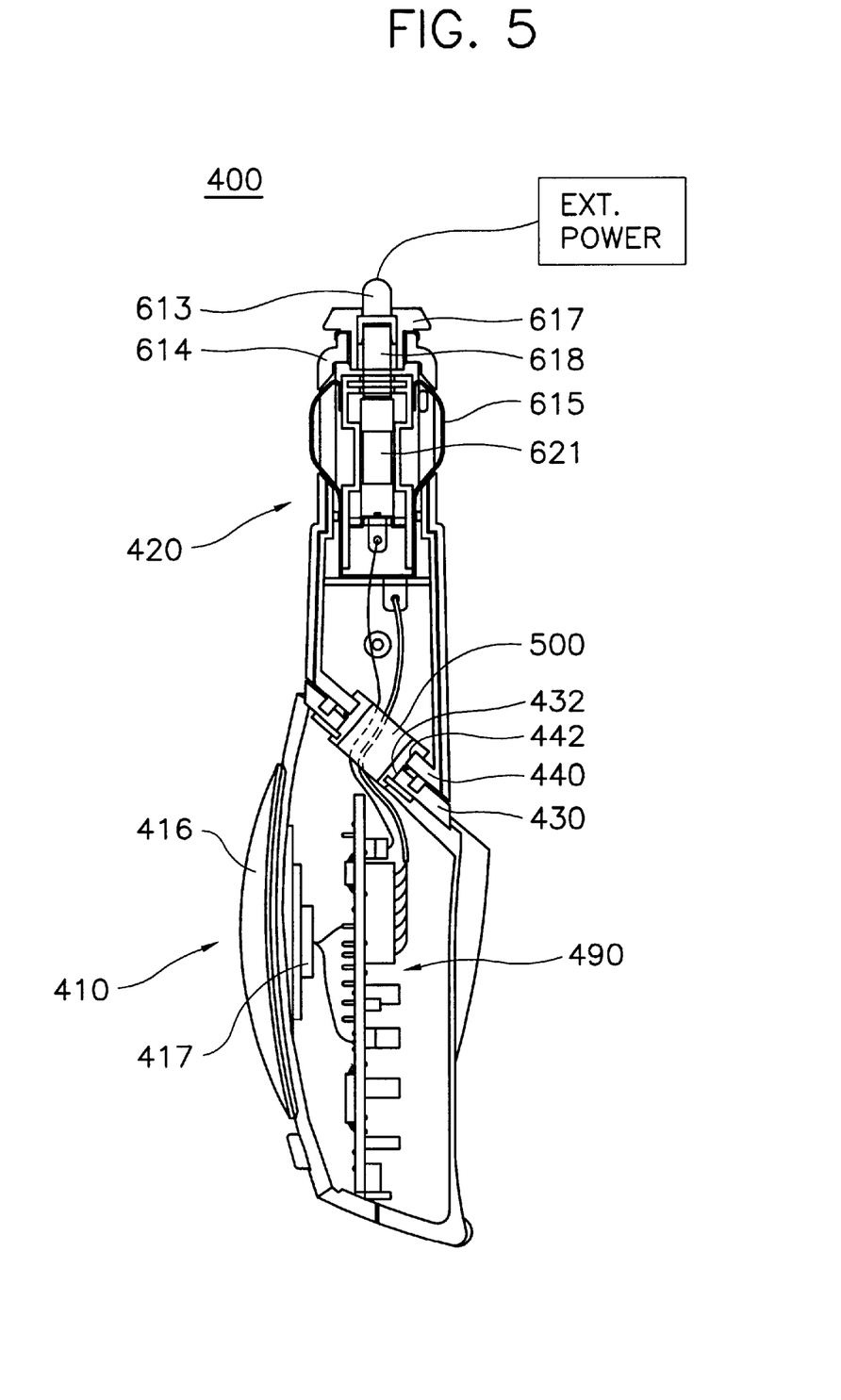
FIG. 5 is a sectional view showing an inner structure of the hand-free kit.

Meanwhile, FIG. 5 shows an inner structure of hand-free kit 400 in accordance with a preferred embodiment of the present invention. Referring to FIG. 5, main body 410 receives a printed circuit board(PCB) 490 for signal processing the audio signal between the mobile communication device. Aforementioned plug cord 470 extending from main body 410 is electrically communicated with PCB 490. PCB 490 in main body 410 and connector member 420 are electrically communicated with each other by electric lines extending through a core of shaft member 500.

According to a preferred embodiment of the present invention, main body 410 includes at a lower end portion thereof with a microphone socket 452 and an earphone socket 454 which are electrically communicated with PCB 490. With microphone socket 452, some kinds of microphones can be connected so as to transmit a sound of a speaking person. Also, by preference, any earphone can be connected to earphone socket 454 so as to directly transmit a sound to the ears of a listener. Meanwhile, a volume knob 456 is installed to a side portion of main body 410 for controlling a volume of the audio signal propagating outwardly from speaker portion 417, which is also electrically communicated with PCB 490.

A light emitting diode(LED) 419 is installed in main body 410 for indicating operational modes of PCB 490. Speaker portion 417, microphone socket 452, earphone socket 454 and LED 419 turn with respect to shaft member 500 when main body 410 rotates.

Connector member 420 includes at an upper portion thereof, which is referred to as "a first portion" in the claims, connected to an external power source (not shown), that is the cigar portion, with a pin 613 which is made of a conductive material and extends outwardly toward the external power source. Connector member 420 receives a fuse 621 therein at an upper portion thereof for preventing an over-current.

According to a preferred embodiment of the present invention, a compression spring 618 is disposed between pin 613 and fuse 621 so as to urge pin 613 toward the external power source.

Meanwhile, the upper portion, that is the first portion, of connector member 420 is inserted into a holder 614 having a ring shape, and a cap 617 is engaged with the first portion of connector member 420, thereby assembling third and fourth housings 422 and 424 together in corporation with holder 614. At this time, cap 617 is screwed into connector member 420.

According to a preferred embodiment of the present invention, connector member 420 is provided at both sides with a couple of plate springs 615 bent outwardly by a predetermined thickness so as to be stably inserted into the external power source.

Figure 6:
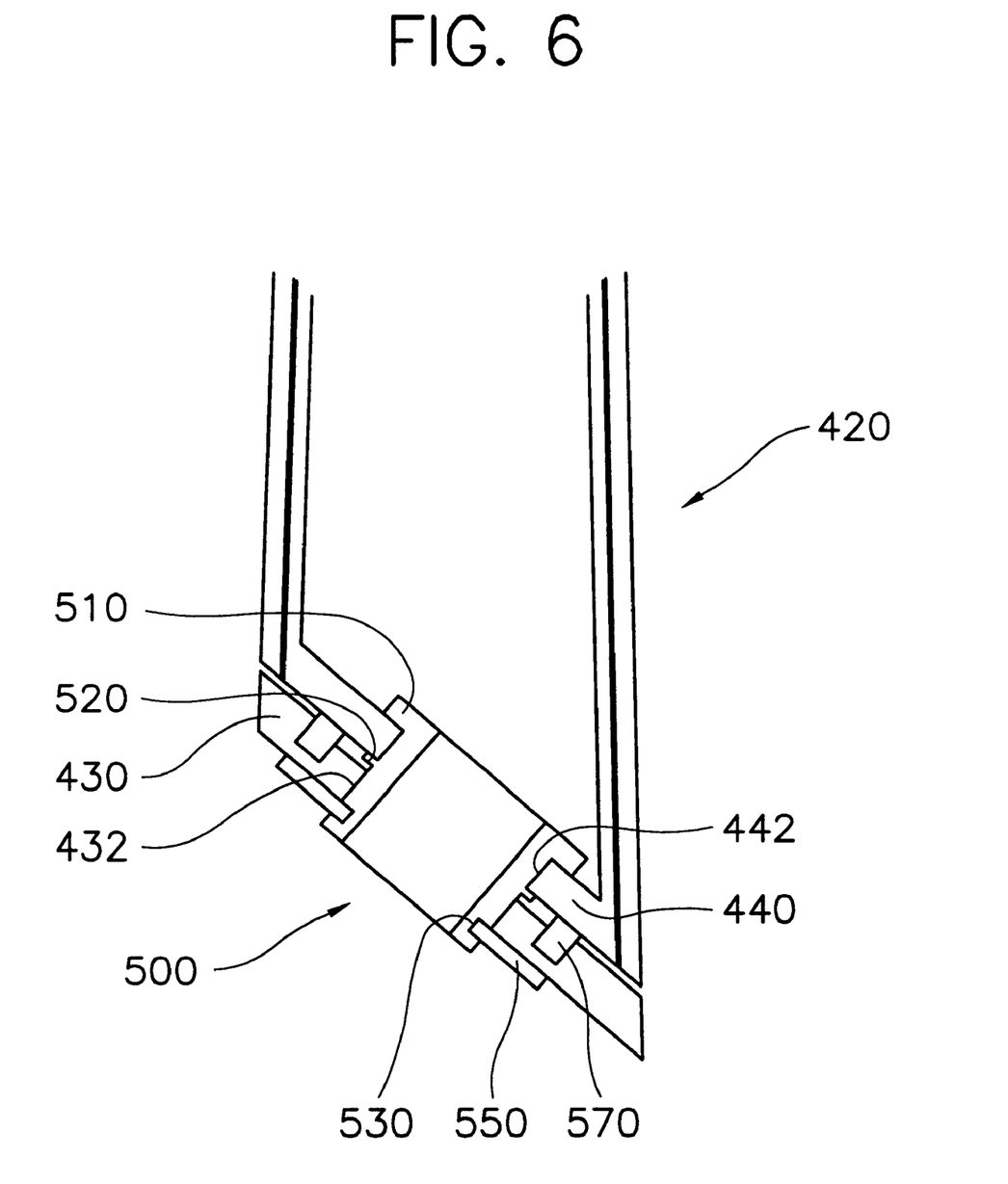
FIG. 6 is a sectional view of a shaft member in accordance with a preferred embodiment of the present invention.

Referring now to FIGS. 5 and 6, shaft member 500 is shown in detail. Shaft member 500 has a substantially cylindrical shape. An axial direction of shaft member 500 is orthogonal to first and second oblique portions 430 and 440. Shaft member 500 is formed at a first end portion thereof with first and second flanges 430 and 440 and is formed at a second end portion thereof with an annular groove 530. First and second flanges 430 and 440 are slidably engaged with second oblique portion 440 of connector member 420. In detail, first and second flanges 430 and 440 are spaced apart from each other by an interval substantially identical to a thickness of second oblique portion 440 so as to be inserted into second opening 442 formed at second oblique portion 440, thereby rotatably supporting main body 410.

On the other hand, annular groove 530 of shaft member 500 is inserted through first oblique portion 430 of main body 410 by a predetermined depth. An E-ring 550 is disposed around annular groove 530 of shaft member 500 and makes contact with an inner wall around first opening 432 formed at first oblique portion 430 so as to prevent main body 410 from being separated therefrom.

According to a preferred embodiment of the present invention, an O-ring 570 is disposed around shaft member 500 and interposes between main body 410 and connector member 420, thereby rendering main body 410 to smoothly slide with respect to connector body 420.

Hereinafter, an operational mechanism and an assembling method of band-free kit 400 in accordance with a preferred embodiment of the present invention will be described.

Figure 7:
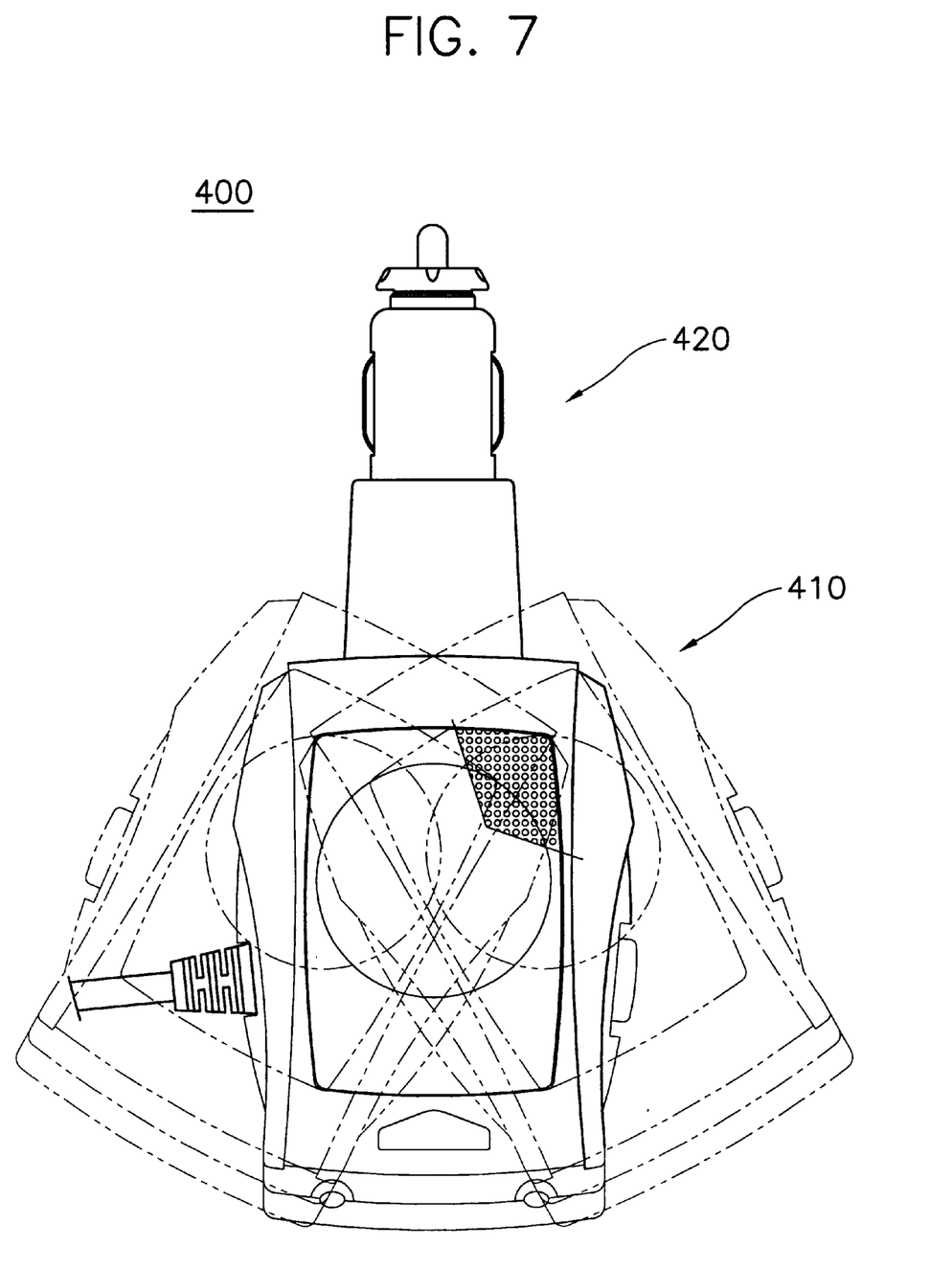
FIG. 7 is an operational view for illustrating an oblique rotation of a main body in accordance with a preferred embodiment of the present invention.
Figure 8:
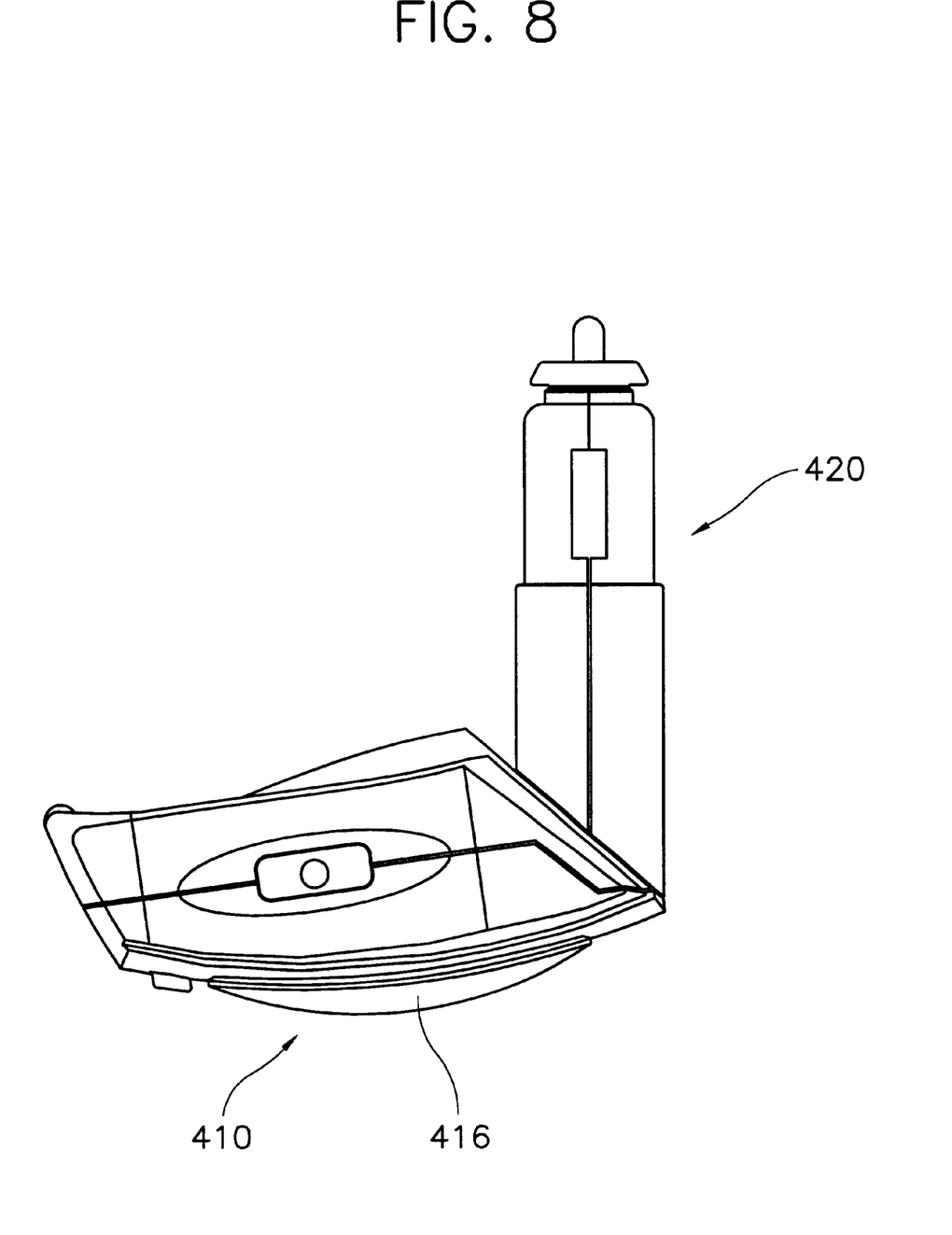
FIG. 8 is a side view of the hand-free kit wherein the main body rotates by 180 degrees.

FIGS. 7 and 8 show various states where main body 410 rotates in various directions. Referring to FIGS. 7 and 8, and for example, in a case that the cigar portion in a car is positioned between the driver's seat and the passenger's seat, for a convenient communication for the driver, main body 410 can rotate toward the driver with its grill portion 416. In another situation where the passenger must communicate with the mobile communication device, main body 410 may rotate toward the passenger. At the extreme situation, as shown in FIG. 8, main body 410 can rotate by 180 degrees in maximum.

The assembling method for hand-free kit 400 is explained as follows with reference to FIG. 6. Firstly, connector member 420 and shaft member 500 are assembled in such manners that first and second flanges 510 and 520 are inserted into second oblique portion 440 formed at third and fourth housings 422 and 424 of connector member 420 and that a circumferential end portion of second opening 442 is engaged between first and second flanges 510 and 520. Next, first opening 432 in second housing 414 of main body 410 receives shaft member 500 such that annular groove 530 is located inside first oblique portion 430. Then, E-ring 550 is disposed around annular groove 530, and thereafter, first housing 412 is secured to second housing 414, thereby completely assembling hand-free kit 400.

The multi-directional hand-free kit in accordance with a preferred embodiment of the present invention can be adjustable in the sound propagation direction thereof to pace with the listener. That is, the positions of the speaker portion, the microphone, the earphone and the light emitting diode are easily controlled, thereby satisfying the listener with maximum environment.

In addition, the main body and the connector member are respectively separable so that the assembling and disassembling thereof are ready, thereby facilitating repair work therefor.

Furthermore, the hand-free kit in accordance with a preferred embodiment of the present invention is available for all situations including a household use and an automobile use.

Although the preferred embodiment of the invention has been described, it is understood that the present invention should not be limited to these preferred embodiments, but various changes and modifications can be made by one skilled in the art within the spirit and scope of the invention as hereinafter claimed.

What is claimed is:

1. A hand-free kit for a wireless communication device, comprising:

a main body including a printed circuit board for controlling audio signal sending and receiving with respect to a communication device, and formed at one side thereof with a first oblique portion;

a connector member for connection with an external power source so as to electrically communicate with the printed circuit board, the connector member being formed at a portion of said main body thereof facing the first oblique portion with a second oblique portion inclined by a substantially identical angle to an inclined angle of the first oblique portion, the second oblique portion frictionally making contact with the first oblique portion; and a shaft member for connecting the main body and the connector member in such a manner that the main body and the connector member are obliquely rotatable to each other.

2. The kit as recited in claim 1, wherein the main body includes first and second housings which are detachable from each other and a speaker portion for forwardly propagating a sound wave, the speaker portion being electrically connected to the printed circuit board.

3. The kit as recited in claim 2, wherein the main body includes at outer sides thereof a microphone socket, an earphone socket, a light emitting diode for indicating operational modes of the printed circuit board and a volume knob for controlling a volume of an audio signal propagating outwardly from the speaker portion, each of which being electrically connected to the printed circuit board.

4. The kit as recited in claim 3, wherein the speaker portion, the microphone socket, the earphone socket and the light emitting diode turn with respect to the shaft member when the,,main body rotates.

5. The kit as recited in claim 1, wherein the connector member includes third and fourth housings extending in one direction and detachable from each other, and includes at a first portion thereof a pin which is made of a conductive that extends outwardly toward external power source, the connector member further receiving a fuse therein for preventing an over-current condition.

6. The kit as recited in claim 5, wherein a compression spring is disposed between the pin and the fuse so as to urge the pin toward an external power source.

7. The kit as recited in claim 5, wherein the first portion of the connector member is inserted into a holder having a ring shape, and a cap is engaged with the first portion for assembling the third and fourth housing together with the holder.

8. The kit as recited in claim 5, wherein the connector member is provided at both sides with plate springs bent outwardly by a predetermined thickness so as to be stably inserted into the external power source.

9. The kit as recited in claim 5, wherein the shaft member has a substantially cylindrical shape, is formed at a first end portion thereof with first and second flanges, and is formed at a second end portion thereof with an annular groove, the first and second flanges being slidably engaged with the second oblique portion of the connector member, the annular groove being inserted through the first oblique portion of the main body by a predetermined depth.

10. The kit as recited in claim 9, wherein an axial direction of the shaft member is orthogonal to the first and second oblique portions.

11. The kit as recited in claim 9, wherein the first and second flanges are spaced apart from each other by a predetermined interval substantially identical to a thickness of the second oblique portion so as to be inserted into an opening formed at the second oblique portion, thereby rotatably supporting the main body.

12. The kit as recited in claim 9, wherein an E-ring is disposed around the annular groove of the shaft member and makes contact with an inner wall around an opening formed at the first oblique portion so as to prevent the main body from being separated therefrom.

13. The kit as recited in claim 1, wherein the printed circuit board in the main body is electrically connected to the first portion of the connector member by electric lines extending through a core of the shaft member.

14. The kit as recited in claim 1, wherein an O-ring is disposed around the shaft member between the main body and the connector member for allowing the main body to smoothly slide with respect to the connector body.

* * * * *